(12) United States Patent
Miller (10) Patent No.: US 8,518,573 B2
(45) Date of Patent: Aug. 27, 2013

(54) LOW-INDUCTIVE IMPEDANCE, THERMALLY DECOUPLED, RADII-MODULATED ELECTRODE CORE

(75) Inventor: John M. Miller, Cedar, MI (US)

(73) Assignee: Maxwell Technologies, Inc., San Diego, CA (US)

( * ) Notice: Subject to any disclaimer, the term of this patent is extended or adjusted under 35 U.S.C. 154(b) by 659 days.

(21) Appl. No.: 12/647,361

(22) Filed: Dec. 24, 2009

(65) Prior Publication Data

US 2010/0273061 A1  Oct. 28, 2010

Related U.S. Application Data

(63) Continuation-in-part of application No. 11/537,487, filed on Sep. 29, 2006, now abandoned, and a continuation-in-part of application No. 11/536,980, filed on Sep. 29, 2006, now abandoned, and a continuation-in-part of application No. 11/536,916, filed on Sep. 29, 2006, now abandoned.

(51) Int. Cl.
| | | |
|---|---|---|
| *H01M 10/50* | (2006.01) | |
| *H01M 6/00* | (2006.01) | |
| *H01M 10/00* | (2006.01) | |
| *H01M 2/14* | (2006.01) | |
| *H01M 2/16* | (2006.01) | |
| *H01M 2/18* | (2006.01) | |
| *H01M 4/02* | (2006.01) | |
| *H01M 4/13* | (2010.01) | |
| *H01M 4/58* | (2010.01) | |
| *H01H 9/28* | (2006.01) | |
| *H01G 9/00* | (2006.01) | |
| *H01G 2/14* | (2006.01) | |
| *H01G 2/12* | (2006.01) | |
| *H02H 7/16* | (2006.01) | |

(52) U.S. Cl.
USPC ........... 429/120; 429/122; 429/129; 429/142; 429/209; 429/218.1; 429/231.8; 361/15; 361/270; 361/271; 361/502; 361/503

(58) Field of Classification Search
USPC ........... 361/15, 270, 271, 502, 503; 429/122, 429/129, 142, 209, 218.1, 231.8, 120
See application file for complete search history.

(56) References Cited

U.S. PATENT DOCUMENTS 2,692,210 A  10/1954  Burnham
3,528,955 A   9/1970  Lippman et al.
(Continued)

FOREIGN PATENT DOCUMENTS

EP  0617441  9/1994
EP  1009058  6/2000
(Continued)

OTHER PUBLICATIONS

Real Dictionary (Entries: Circumferential and Axis) Princeton University Princeton NJ USA © 2001 Available May 26, 2003 {http://www.realdictionary.com}.*

(Continued)

*Primary Examiner* — Patrick Ryan
*Assistant Examiner* — Aaron Greso
(74) *Attorney, Agent, or Firm* — Knobbe Martens Olson & Bear LLP (57) ABSTRACT

An energy-storage device electrode core is disclosed that features relatively low-inductive impedance (and thus low equivalent series resistance (ESR)). Also disclosed is an energy-storage device electrode core that features a radii-modulated electrode core that forms extra vias to facilitate efficient heat removal away from the electrode, thus improving the performance and capabilities of an energy-storage device so equipped. The internal electrode core heat-removal vias are defined by the modulation patterns that in turn define the size and layout of the folds in the electrode, which are circumferentially collapsed about the center axis of the electrode core.

20 Claims, 4 Drawing Sheets

(56) References Cited

U.S. PATENT DOCUMENTS

| | | | |
|---|---|---|---|
| 3,864,124 A | 2/1975 | Breton et al. | |
| 3,946,751 A * | 3/1976 | Breiter et al. | ............ 429/166 |
| 4,129,633 A | 12/1978 | Biddick | |
| 4,153,661 A | 5/1979 | Ree et al. | |
| 4,175,055 A | 11/1979 | Goller et al. | |
| 4,177,159 A | 12/1979 | Singer | |
| 4,194,040 A | 3/1980 | Breton et al. | |
| 4,287,232 A | 9/1981 | Goller et al. | |
| 4,313,972 A | 2/1982 | Goller et al. | |
| 4,317,789 A | 3/1982 | Groukt et al. | |
| 4,320,184 A | 3/1982 | Bernstein et al. | |
| 4,320,185 A | 3/1982 | Bernstein et al. | |
| 4,336,217 A | 6/1982 | Seuer | |
| 4,354,958 A | 10/1982 | Solomon | |
| 4,383,010 A | 5/1983 | Spaepen | |
| 4,481,558 A | 11/1984 | Endoh et al. | |
| 4,482,931 A | 11/1984 | Yializis | |
| 4,500,647 A | 2/1985 | Solomon | |
| 4,556,618 A | 12/1985 | Shia | |
| 4,737,889 A | 4/1988 | Nishino et al. | |
| 4,758,473 A | 7/1988 | Herscovici et al. | |
| 4,822,701 A | 4/1989 | Ballard et al. | |
| 4,877,694 A | 10/1989 | Solomon et al. | |
| 4,895,775 A | 1/1990 | Kato et al. | |
| 4,917,309 A | 4/1990 | Zander et al. | |
| 4,992,910 A | 2/1991 | Evans | |
| 5,100,747 A | 3/1992 | Hayashida et al. | |
| 5,136,474 A | 8/1992 | Sarangapani et al. | |
| 5,150,283 A | 9/1992 | Yoshida et al. | |
| 5,162,178 A | 11/1992 | Ohsawa et al. | |
| 5,168,019 A | 12/1992 | Sugeno | |
| 5,198,313 A | 3/1993 | Juergens | |
| 5,214,564 A | 5/1993 | Metzler et al. | |
| 5,381,303 A | 1/1995 | Yoshida et al. | |
| 5,393,617 A | 2/1995 | Klein | |
| 5,436,093 A | 7/1995 | Huang et al. | |
| 5,450,279 A | 9/1995 | Yoshida et al. | |
| 5,456,000 A | 10/1995 | Gozdz et al. | |
| 5,470,357 A | 11/1995 | Schmutz et al. | |
| 5,478,363 A | 12/1995 | Klein | |
| 5,478,668 A | 12/1995 | Gozdz et al. | |
| 5,482,906 A | 1/1996 | Sakai et al. | |
| 5,557,497 A | 9/1996 | Ivanov et al. | |
| 5,593,462 A | 1/1997 | Gueguen et al. | |
| 5,621,607 A | 4/1997 | Farahmandi et al. | |
| 5,636,437 A | 6/1997 | Kaschmitter et al. | |
| 5,682,288 A | 10/1997 | Wani | |
| 5,698,342 A | 12/1997 | Klein | |
| 5,706,165 A | 1/1998 | Saito et al. | |
| 5,707,763 A | 1/1998 | Shlmizu et al. | |
| 5,720,780 A | 2/1998 | Liu et al. | |
| 5,786,555 A | 7/1998 | Saito et al. | |
| 5,786,980 A | 7/1998 | Evans | |
| 5,840,087 A | 11/1998 | Gozdz et al. | |
| 5,846,675 A | 12/1998 | Sazhin et al. | |
| 5,849,431 A | 12/1998 | Kita et al. | |
| 5,879,836 A | 3/1999 | Ikeda et al. | |
| 5,880,497 A | 3/1999 | Ikeda et al. | |
| 5,914,019 A | 6/1999 | Dodgson et al. | |
| 5,955,215 A | 9/1999 | Kurzweil et al. | |
| 5,973,912 A | 10/1999 | Kibi et al. | |
| 6,022,436 A | 2/2000 | Koslow et al. | |
| 6,024,773 A | 2/2000 | Inuzuka et al. | |
| 6,031,712 A | 2/2000 | Kurihara et al. | |
| 6,072,692 A | 6/2000 | Hiratsuka et al. | |
| 6,094,338 A | 7/2000 | Hirahara et al. | |
| 6,110,335 A | 8/2000 | Avarbz et al. | |
| 6,114,835 A | 9/2000 | Price | |
| 6,127,474 A | 10/2000 | Andelman | |
| 6,134,760 A | 10/2000 | Mushiake et al. | |
| 6,159,611 A | 12/2000 | Lee et al. | |
| 6,181,545 B1 | 1/2001 | Amatucci et al. | |
| 6,187,061 B1 | 2/2001 | Amatucci et al. | |
| 6,201,685 B1 | 3/2001 | Jerabek et al. | |
| 6,207,251 B1 | 3/2001 | Balsmo et al. | |
| 6,222,715 B1 | 4/2001 | Gruhn | |
| 6,236,560 B1 | 5/2001 | Ikeda et al. | |
| 6,238,560 B1 | 5/2001 | Gershenson | |
| 6,238,818 B1 | 5/2001 | Dalton | |
| 6,245,464 B1 | 6/2001 | Spillman et al. | |
| 6,259,595 B1 | 7/2001 | Hebel et al. | |
| 6,262,360 B1 | 7/2001 | Michel | |
| 6,301,092 B1 | 10/2001 | Hata et al. | |
| 6,304,426 B1 | 10/2001 | Wei et al. | |
| 6,308,405 B1 | 10/2001 | Takamatsu et al. | |
| 6,310,756 B1 | 10/2001 | Miura et al. | |
| 6,323,750 B1 | 11/2001 | Lampl et al. | |
| 6,349,027 B1 | 2/2002 | Suhara et al. | |
| 6,359,769 B1 | 3/2002 | Mushiake et al. | |
| 6,377,441 B1 | 4/2002 | Ohya et al. | |
| 6,403,257 B1 | 6/2002 | Christian et al. | |
| 6,424,514 B1 | 7/2002 | Boy et al. | |
| 6,447,669 B1 | 9/2002 | Lain | |
| 6,459,564 B1 | 10/2002 | Watanabe et al. | |
| 6,461,759 B1 * | 10/2002 | Miller et al. | ............ 429/94 |
| 6,493,210 B2 | 12/2002 | Nonaka et al. | |
| 6,558,835 B1 | 5/2003 | Kurisu et al. | |
| 6,589,299 B2 | 7/2003 | Missling et al. | |
| 6,614,646 B2 | 9/2003 | Bogaki et al. | |
| 6,627,252 B1 | 9/2003 | Nanjundiah et al. | |
| 6,645,664 B2 | 11/2003 | Nakanishi et al. | |
| 6,677,078 B2 | 1/2004 | Reise et al. | |
| 6,697,249 B2 | 2/2004 | Malatin et al. | |
| 6,708,757 B2 | 3/2004 | Hebel et al. | |
| 6,761,744 B1 | 7/2004 | Tsukamoto et al. | |
| 6,795,297 B2 | 9/2004 | Iwalda et al. | |
| 6,800,222 B1 | 10/2004 | Noguchi et al. | |
| 6,804,108 B2 | 10/2004 | Nanjundiah et al. | |
| 6,808,845 B1 | 10/2004 | Nonaka et al. | |
| 6,831,826 B2 | 12/2004 | Iwalda et al. | |
| 6,841,594 B2 | 1/2005 | Jones et al. | |
| 6,847,517 B2 | 1/2005 | Lwalda et al. | |
| 6,906,911 B2 | 6/2005 | Ikeda et al. | |
| 6,912,116 B2 | 6/2005 | Takahashi et al. | |
| 6,918,991 B2 | 7/2005 | Chickering, III et al. | |
| 7,018,568 B2 | 3/2006 | Tierney | |
| 7,090,946 B2 | 8/2006 | Mitchell et al. | |
| 7,139,162 B2 | 11/2006 | Michel et al. | |
| 7,295,423 B1 | 11/2007 | Mitchell et al. | |
| 2001/0014420 A1 | 8/2001 | Takeuchi et al. | |
| 2001/0019796 A1 | 9/2001 | Kang et al. | |
| 2002/0008956 A1 | 1/2002 | Niu | |
| 2002/0039275 A1 | 4/2002 | Takeuchi et al. | |
| 2002/0059975 A1 | 5/2002 | Ishikawa et al. | |
| 2002/0096661 A1 | 7/2002 | Shinozaki et al. | |
| 2002/0122985 A1 | 9/2002 | Sato et al. | |
| 2002/0138958 A1 | 10/2002 | Nonaka et al. | |
| 2002/0150812 A1 | 10/2002 | Kaz et al. | |
| 2002/0163773 A1 | 11/2002 | Niori et al. | |
| 2002/0167784 A1 | 11/2002 | Takatami et al. | |
| 2002/0167785 A1 | 11/2002 | Kamath | |
| 2003/0030963 A1 | 2/2003 | Tennent et al. | |
| 2003/0113636 A1 | 6/2003 | Sano et al. | |
| 2003/0157314 A1 | 8/2003 | Penneau et al. | |
| 2003/0169558 A1 | 9/2003 | Olson et al. | |
| 2003/0175494 A1 | 9/2003 | Penneau et al. | |
| 2003/0180622 A1 | 9/2003 | Tsukude et al. | |
| 2003/0186110 A1 | 10/2003 | Sloop | |
| 2003/0202316 A1 | 10/2003 | Kawasato et al. | |
| 2004/0027782 A1 | 2/2004 | Erhardt et al. | |
| 2004/0032698 A1 * | 2/2004 | Paul et al. | ............ 361/15 |
| 2005/0024314 A1 | 2/2005 | Noguchi et al. | |
| 2005/0064289 A1 | 3/2005 | Suzuki et al. | |
| 2005/0078432 A1 | 4/2005 | Gallay et al. | |
| 2005/0153197 A1 * | 7/2005 | Coffey et al. | ............ 429/94 |
| 2005/0225929 A1 | 10/2005 | Murakami et al. | |
| 2005/0266298 A1 | 12/2005 | Mitchell et al. | |
| 2005/0266990 A1 | 12/2005 | Iwasaki et al. | |
| 2006/0035785 A1 | 2/2006 | Tanaka | |
| 2006/0039100 A1 | 2/2006 | Asano et al. | |
| 2006/0054277 A1 | 3/2006 | Byun et al. | |
| 2006/0105624 A1 | 5/2006 | Yoshikane et al. | |
| 2006/0109608 A1 | 5/2006 | Zhong et al. | |
| 2006/0133012 A1 | 6/2006 | Zhong et al. | |

| | | | | | |
|---|---|---|---|---|---|
| 2006/0133013 A1 | 6/2006 | Xi et al. | JP | 04-088619 | 3/1992 |
| 2006/0137158 A1 | 6/2006 | Zou et al. | JP | 05-129020 | 5/1993 |
| 2006/0143884 A1 | 7/2006 | Mitchell et al. | JP | 08-096810 | 4/1996 |
| 2006/0146475 A1 | 7/2006 | Zhong et al. | JP | 09-183604 | 7/1997 |
| 2006/0146479 A1 | 7/2006 | Mitchell et al. | WO | WO 98/34977 | 8/1998 |
| 2006/0147712 A1 | 7/2006 | Mitchell et al. | WO | WO 2004087984 * | 10/2004 |
| 2006/0172134 A1 * | 8/2006 | Ro et al. ............. 428/408 | WO | WO 2006/001847 | 1/2006 |
| 2007/0026317 A1 | 2/2007 | Mitchell et al. | WO | WO 2006/135495 | 12/2006 |
| 2007/0177334 A1 | 8/2007 | Thrap | | | |
| 2007/0184711 A1 | 8/2007 | Thrap et al. | | | |
| 2008/0081250 A1 | 4/2008 | Miller | | | |
| 2008/0081251 A1 | 4/2008 | Miller | | | |

FOREIGN PATENT DOCUMENTS

| | | |
|---|---|---|
| EP | 1126536 | 8/2001 |
| JP | 01-241811 | 9/1989 |
| JP | 04-067610 | 3/1992 |

OTHER PUBLICATIONS

The Free Dictionary Annular Collins English Dictionary Comoplete and Unabridged Harper Colllins 2003 New York {http://www.thefreedictionary.com/annular}.*

* cited by examiner

LOW-INDUCTIVE IMPEDANCE, THERMALLY DECOUPLED, RADII-MODULATED ELECTRODE CORE

CROSS-REFERENCE TO RELATED APPLICATIONS

This patent application claims the benefit of and is a continuation-in-part of U.S. patent application Ser. No. 11/536,916, which was filed on Sep. 29, 2006 now abandoned, and which is hereby incorporated by reference for all purposes. This patent application also claims the benefit of and is a continuation-in-part of U.S. patent application Ser. No. 11/536,980, which was filed on Sep. 29, 2006 now abandoned, and which is hereby incorporated by reference for all purposes. Finally, this patent application also claims the benefit of and is a continuation-in-part of U.S. patent application Ser. No. 11/537,487, which was filed on Sep. 29, 2006 now abandoned, and which is hereby incorporated by reference for all purposes.

BACKGROUND

The disclosures contained herein relate generally to energy-storage devices and in particular relate to increasing energy-storage device electrode core operational performance characteristics.

Energy-storage device element design is driven by a variety of parameters, such as, for example, thermal characteristics and electromagnetic problems (e.g., equivalent series resistance (ESR), inductance). One of the most important elements of an energy storage device for optimal functioning is an electrode core. Key operational performance characteristics for the electrode core of an energy-storage device (e.g., ultracapacitor, battery, hybrid energy-storage device, etc.) include, inter alia, thermal control and inductance effects.

A need exists to increase thermal performance of energy-storage device elements, particularly within the electrode core. Also, design enhancements are needed in the area of thermal gradients within the energy-storage device cell and cell-packs (multi-cell modules). Moreover, control of heat flow away from the electrode core is becoming more important, particularly as industry needs, such as electric automobiles, drives the commercial sector. Any advancement in the efficiency of thermal performance will increase the utility of an associated energy storage device. As industry usage of energy-storage cell modules increases (such as, for example, in "hybrid" automobiles), the need to control thermal gradients in such modules is fast becoming evident. In addition, usage of such cell modules in geographical regions which have relatively high ambient temperatures, would greatly, benefit from a better energy-storage device design emphasizing thermal considerations.

Another design issue with some energy-storage devices, such as modern ultracapacitor cells, is internal inductance, generated by the circumferential current flow about the "jelly-roll" inside the cell core. Such an inductance creates an undesirable impedance for an ultracapacitor electrode core, ultimately degrading performance, as will be appreciated by those of skill in the art. Any reduction in the amount of internal inductance within the electrode core would improve performance.

Moreover, as will be appreciated by those of ordinary skill in the energy-storage device electrode core arts, inductance of ultracapacitor electrode cores causes damage to cell-module balancers, due to over-voltage. Therefore, a need exists for a reduction in failure of energy-storage device cell modules due to balancer damage.

Furthermore, modern cell construction techniques for ultracapacitors includes a core involute. The core involute contributes to sharp bend radii of an electrode core (contributing to "hot" spots in the electrode core), and possibly contributes to leakage current. Such hot spots and leakage current further degrade ultracapacitor performance.

Therefore, a need exists to improve the thermal and electromagnetic performance of an energy storage device electrode core, as well as reducing problematic effects of a core involute.

BRIEF SUMMARY

An energy-storage device electrode core is disclosed that features relatively low-inductive impedance (and thus low equivalent series resistance (ESR)) as compared to the prior art. The disclosed energy-storage device electrode core departs from a traditional "jelly-roll" type of core by effectively reducing the number of "turns" in the electrode core (and thus reducing the inductive impedance of the electrode core) to approximately one, yet maintaining a comparable effective electrode surface area.

Also disclosed is an energy-storage device electrode core that features a radii-modulated electrode core that forms extra vias to facilitate efficient heat removal away from the electrode, thus improving the performance and capabilities of an energy-storage device so equipped as compared to the prior art. The internal electrode core heat-removal vias are defined by the modulation patterns that in turn define the size and layout of the folds in the electrode, which are circumferentially collapsed about the center axis of the electrode core.

The disclosed advances in the design of an energy-storage device electrode core enhance the overall operating performance of an energy-storage device.

Nothing within this Brief Summary section is intended to limit the scope of the disclosure contained within this entire patent application.

BRIEF DESCRIPTION OF THE DRAWINGS

Embodiments of the disclosed apparatuses and methods will be more readily understood by reference to the following figures, in which like reference numbers and designations indicate like element. The figures are exemplary only and are not intended to limit the scope of the disclosures discussed herein.

DETAILED DESCRIPTION

Overview

The present teachings disclose an apparatus and article of manufacture for optimizing energy-storage electrode core performance. In some embodiments, undesirable inductance is addressed and reduced to enhance electrode core performance. In other embodiments, undesirable thermal heat flow within an electrode core is addressed and reduced to enhance electrode core performance.

Figure 1A:
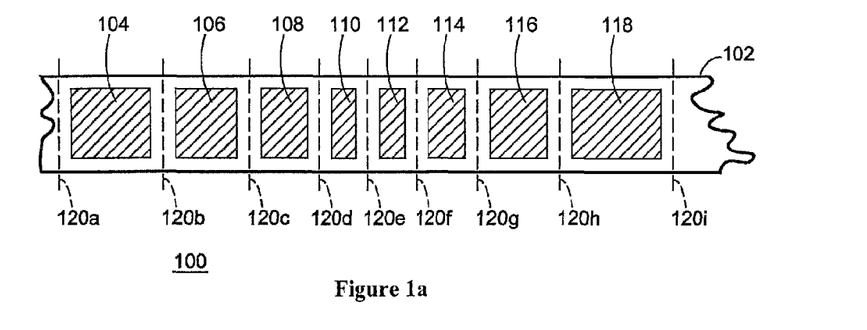
FIG. 1a illustrates a front-plan view of a current-collector foil having a plurality of carbon-electrode elements and a plurality of fold-zone regions defined between a plurality of demarcation regions, according to one embodiment of the present teachings.
Figure 1B:
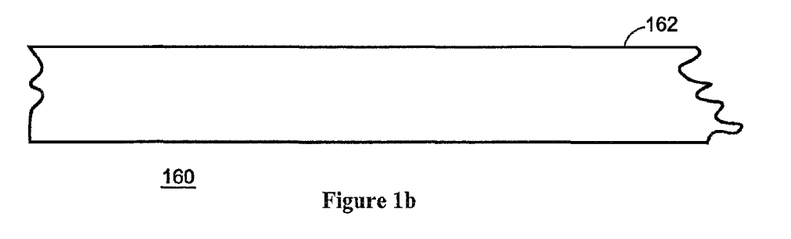
FIG. 1b illustrates a front-plan view of a separator element, according to one embodiment of the present teachings.

Referring now to FIGS. 1a-b, one illustrative exemplary embodiment of an energy-storage electrode 100 is shown. In one embodiment, the energy-storage electrode 100 comprises a heat-flow-controlled ultracapacitor element, comprising a first current-collector foil element 102, a separator element 162, and a second current-collector foil element (not shown). In some embodiments of the present teachings, the second current-collector foil element is identical to the first current-collector foil element 102. In one alternate embodiment of the present disclosure, the energy-storage electrode 100 comprises a variable-radii, annular-electrode core adapted for use in an energy-storage device, comprising a first current-collector foil element 102, a separator element 162, and a second current-collector foil element (not shown). In some embodiments of the present teachings, the second current-collector foil element is identical to the first current-collector foil element 102. In one embodiment, the energy-storage device is an ultracapacitor; however, the present teachings may readily be adapted for use in a lithium-ion battery, hybrid energy-storage devices, or literally any type of energy-storage device which requires an electrode core. In a heat-flow-controlled ultracapacitor embodiment, heat flow is controlled by the ultracapacitor, because the ultracapacitor functions to remove heat from the inside of the ultracapacitor electrode core, as will be described further below.

In one embodiment, the first current-collector foil element 102 is composed of, inter alia, aluminum. FIG. 1a illustrates how electrode material (such as, for example, carbon), is disposed upon both sides of a double-sided current-collector foil. In one embodiment, carbon electrode elements 104, 106, 108, 110, 112, 114, 116, and 118 are disposed along a first side of the first current-collector foil element 102. Also illustrated in FIG. 1a is a modulation of electrode width such that the progressively thinner spans of carbon can be folded back upon itself in the final configuration, as will be described further below. The carbon electrode elements 104, 106, 108, 110, 112, 114, 116, and 118 follow a pulse-width-modulation type of pattern; however literally any kind of shape modulation pattern of the carbon electrode elements 104, 106, 108, 110, 112, 114, 116, and 118 is within the scope of the present teachings; for example, amplitude and/or phase modulated patterns.

In one embodiment, a plurality of carbon-electrode elements 104, 106, 108, 110, 112, 114, 116, and 118 are disposed upon both sides of the current-collector foil 102. It will be appreciated that only one side of the double-sided current-collector foil 102 is illustrated in FIG. 1a. Moreover, the plurality of carbon-electrode elements 104, 106, 108, 110, 112, 114, 116, and 118 each have an identical matched pair respectively disposed on another side of the double-sided current-collector foil 102 (not shown). In other words, carbon-electrode elements are disposed in a modulated pattern on both sides of the double-sided current-collector foil 102 in a similar fashion.

Each of the plurality of carbon-electrode elements 104, 106, 108, 110, 112, 114, 116, and 118 is bounded by a plurality of fold-zone regions defined between a plurality of fold-zone demarcation regions 120a, 120b, 120c, 120d, 120e, 120f, 120g, 120h, and 120i, as illustrated in FIG. 1a. In other words, a first fold-zone region is defined between fold-zone demarcation regions 120a and 120b, whereas a second fold-zone region is defined between fold-zone demarcation regions 120b and 120c. Additional fold zones are similarly defined.

FIG. 1b illustrates a front-plan view of a separator element 162, having a front side and a back side. The separator element 162 has dimensions of length and width approximately identical to the first current-collector foil element 102 described above. In the completed assembly of the apparatus, the separator 100 is interposed between the first current-collector foil element 102 and a second current-collector foil element, as will be described further below. The separator 162 functions to prevent the first current-collector foil element 102 from electronically shorting to the second current-collector foil, while simultaneously allowing ionic current to flow therebetween.

Figure 2:
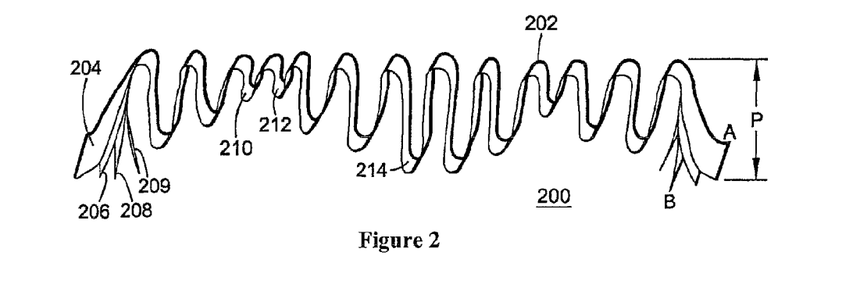
FIG. 2 illustrates a perspective view of an electrode-core element, according to one embodiment of the present disclosure.

FIG. 2 illustrates one exemplary embodiment of a perspective view of an annular electrode core element 200 adapted for use in an ultracapacitor. The annular electrode-core element 200 generally comprises a first current-collector foil element 204, a first separator element 206, a second current-collector foil element 208, and a second separator element 209.

In one exemplary embodiment, the annular electrode core element 200 comprises a radii-modulated, annular electrode core. In this embodiment, the first current collector element 204 of width "W", the first separator element 206, the second current collector foil element 208 of width "W", and the second separator element 209 are layered and folded (collapsed) along the plurality of fold-zone demarcation regions 120a, 120b, 120c, 120d, 120e, 120f, 120g, 120h, and 120i as described above with reference to FIG. 1a. The two current collector foils 204 and 208 are displaced axially such that one foil side "A" overhangs a separator element while the opposite foil side "B" overhangs the separator diametrically opposed to "A".

The annular electrode-core element 200, when folded along the fold-zone demarcation regions, collapses into a structure having a continuous gradation of fold peaks. The peak amplitude "P", as shown in FIG. 2, of the folds is selected so that the outer folds define an outside radius, and a plurality of intermittently disposed inner peaks define an inside radius of a final electrode-core assembly, as will be described further below. A length of the outside radius corresponds to a relatively large amplitude fold 214, whereas the inside radius corresponds to a relatively small amplitude fold 210 and/or 212. In one embodiment, the electrode-core element 200 is adapted for use as a heat-flow-controlled electrode core, wherein the relatively small amplitude folds function to form a thermal via, facilitating heat removal from the electrode core.

It will be appreciated that the relative amplitude of each fold zone is determined by the width of the plurality of carbon-electrode elements 104, 106, 108, 110, 112, 114, 116, and 118, as described above with respect to FIG. 1a. In one exemplary embodiment, the small amplitude fold 212 corresponds to the small width of the carbon-electrode element 110 of FIG. 1a, whereas the large amplitude fold 214 corresponds to the large width of the carbon electrode element 118 of FIG. 1a.

When folded (collapsed), the plurality of carbon-electrode elements 104, 106, 108, 110, 112, 114, 116, and 118 are relatively flat in localized regions between the folds, as will be described further below with respect to FIGS. 3 and 4 in embodiments where an energy-storage device electrode core is formed into an annular electrode core. Because tight foil radii are restricted to only the inner and outer edges of the annular electrode-core element 200, heat dissipation is maximized. Moreover, the "fan-fold" structure readily leads itself to a hollow-cored structure (as will be described further below in greater detail), in which an inner passage is available for heat removal from an energy-storage device electrode cell core.

Figure 3:
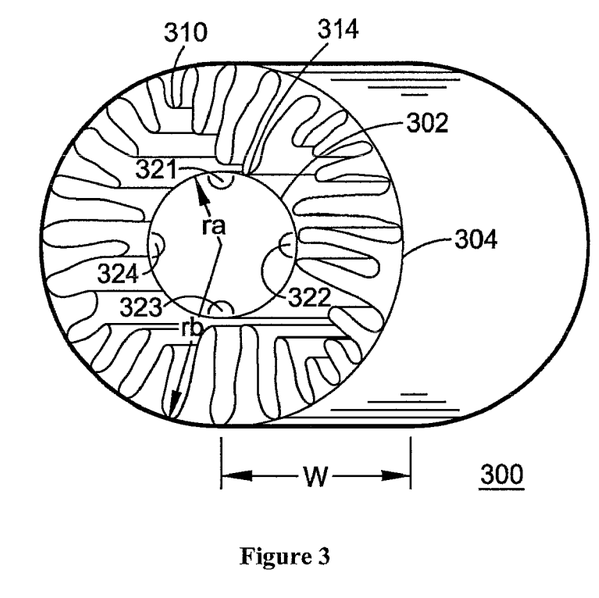
FIG. 3 illustrates a perspective view of an electrode core, according to one embodiment of the present teachings.

FIG. 3 illustrates a perspective view of an electrode core 300, according to one embodiment of the present teachings. In one embodiment, the electrode core 300 comprises a plurality of fold peaks 321, 322, 323, and 324, an inner radius ("$r_a$") 302, and an outer radius ("$r_i$") 304. In the illustrative exemplary embodiment of FIG. 3, an integral number of peaks ("Np") (e.g., the plurality of fold peaks 321, 322, 323, and 324) are oriented about the center of the electrode core 300, as will be described further below.

In one embodiment, the annular electrode-core element 200 of FIG. 2 is compressed (or wrapped) into a circumferentially oriented "accordion-type" shape, in order to achieve the electrode core 300 of FIG. 3. In this embodiment, the electrode core 300 is compressed circumferentially so that an integral number of peaks Np is four (i.e., the plurality of fold peaks 321, 322, 323, and 324). In this configuration of the electrode core 300, a plurality of densely packed electrode carbon-powder patches (not shown) are kept flat along radial lines of a final assembly of the present teachings. Once compressed circumferentially, the carbon-electrode patches fill the annular region (defined in a region between $r_a$ and $r_b$) without loss of active volume, because the presently disclosed teachings provide a Pulse-Width-Modulation ("PWM") pattern with a sufficient number of steps $N_s$ between $r_a$ and $r_b$.

When assembled, the electrode core 300 permits a different type of conductive pathway for current flow, relative to prior-art methods. In prior-art solutions, the normal pathway for current flow in an energy-storage device has been along a circumferential axis, around the wound electrode core. Such a pathway contributes to inductive impedance (due to such a long current path through the many turns of a jelly-roll type of electrode) and reduces overall performance by increasing the equivalent series resistance (ESR) and reducing the overall efficiency of the energy-storage device. By contrast, in the present disclosure, a significant advancement in these problems is achieved because the many turns of the typical jelly-roll-type of electrode core are eliminated; that is, the electrode has less of a "coil" effect, and thus lower inductive impedance. Moreover, the resultant conductive pathway is a substantially along a longitudinal axis of an energy-storage device, thereby eliminating the circumferential current path. Therefore, the present disclosure provides a significantly shorter current path, less inductive impedance, and greater overall efficiency, increased longevity, and reduced equivalent series resistance for the energy-storage device.

Figure 4:
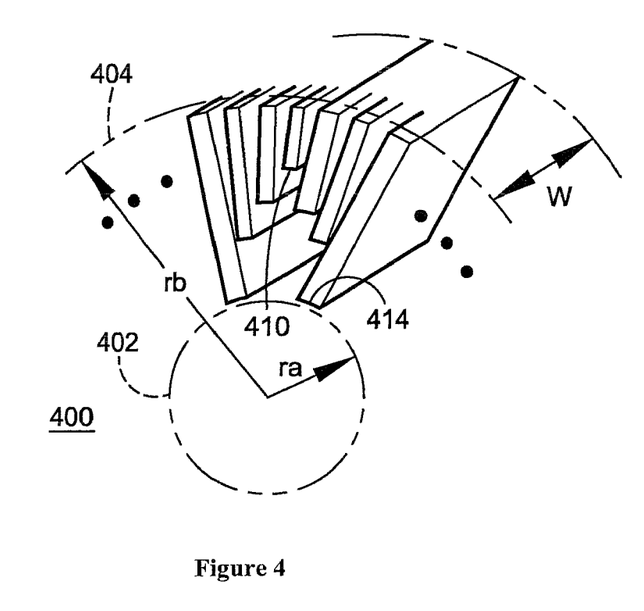
FIG. 4 illustrates a perspective view of a localized region of an annular electrode core, according to one embodiment of the present disclosure.
Figure 5:
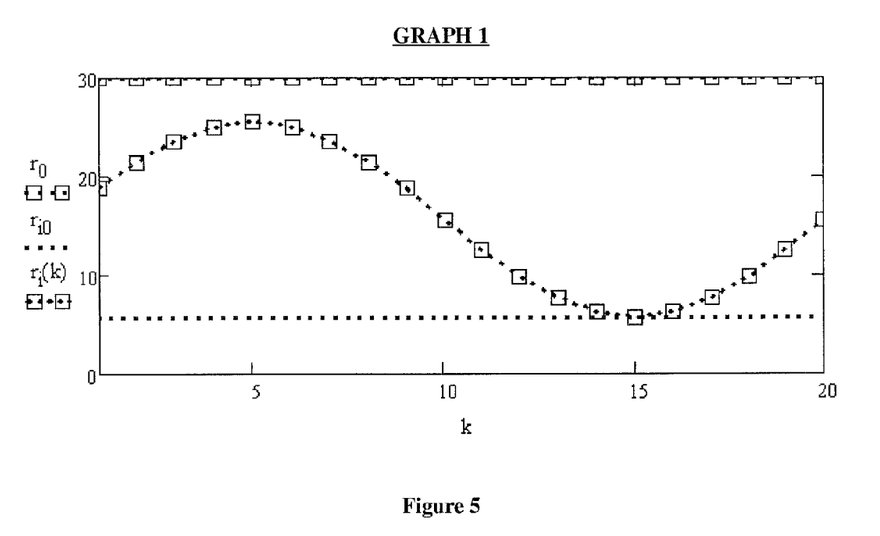
FIG. 5 illustrates GRAPH 1.

FIG. 4 illustrates a perspective view of a localized region of an annular electrode core 400, according to one embodiment of the present disclosure. FIG. 4 highlights how a plurality of carbon-patch areas (e.g., 410 and 414) accumulate to form pie-shaped zones ("thermal vias") such that an entire volume of an annular ring is filled. In this embodiment, the active portions of the carbon electrodes completely fill an annular region and the carbon-electrode deposits are approximately flat. In one embodiment, an amount of carbon-particle-binder material required is reduced, because a resulting electrode matrix will not be exposed to physical tension, such as is found in current so-called "jelly-roll" configurations for energy storage devices, particularly at the core involute.

In one embodiment, the annular electrode core 400 is adapted to improve energy-storage device cell thermal performance, by eliminating the jelly-roll involute. Additionally, this embodiment facilitates approximately complete parallel plate electrode operation, thereby allowing for use of lower tensile strength matrix binders for the carbon powder used for such devices.

In some embodiments of the present teachings, a sinusoidal-modulation fold pattern is employed for the annular electrode core. To describe these embodiments, each "fold" generally begins at an outer radius $r_0$ and progressively decreases in radius with each successive fold, until an inner radius $r_{i0}$ is reached, as will now be described in greater detail. In one embodiment, $r_0$ is equal to $r_b$, and $r_{i0}$ is equal to $r_a$, as described above with respect to FIGS. 3 and 4. Calculation of the relative radial length changes for each successive fold will now be disclosed.

In order to determine a relative radii length for each successive fold in an annular electrode core, the famous "golden ratio" is employed. The golden ratio expresses the relationship that the sum of two quantities is to the larger quantity as the larger is to the smaller. The golden ratio is an irrational number as expressed in EQUATION 1. In some embodiments of the present disclosure, the golden ratio is used as a starting point for initial sizing for the radii amplitudes peak-to-peak, as will now be described.

$$\Psi = \frac{\sqrt{5} - 1}{2} \qquad \text{EQUATION 1}$$

$$\Psi = 0.618$$

Also, using the golden ratio as a starting point, note that:

$$\Psi_r = \left(\frac{1}{\Psi} - 1\right); \qquad \text{EQUATION 2}$$

$$\Psi_r = 0.618$$

Define a number of folds "N" over a half period of radii modulation pattern:

$N=20; K=1 \ldots N$

Now, in one embodiment:

$r_0$=30 mm; initial outer radius for the other annular package.

Then let the maximum excursion of $r_i(\theta)$–0.85 $r_0$, which results in:

$$r_{i0} = (1 - \Psi) \cdot \frac{r_0}{2}; \qquad \text{EQUATION 3}$$

$r_{i0}$=5.729 mm; inner radius starting points on magnitude $r_{pp}$=0.85$r_0$–$r_{i0}$; $r_{pp}$=19.771 mm peak-to-peak variation.

In one embodiment, a modulated radii composite function is calculated according to EQUATION 4, and the relative radial lengths are shown in GRAPH 1, illustrated in FIG. 1:

$$r_i(k) = \frac{r_{pp}}{2} \cdot \sin\left(\frac{2k \cdot \pi}{N}\right) + r_{i0} + \frac{r_{pp}}{2} \text{ mm} \qquad \text{EQUATION 4}$$

The actual fold pattern length are then $r_{i0}$–$r_i(k)$.

Figure 6:
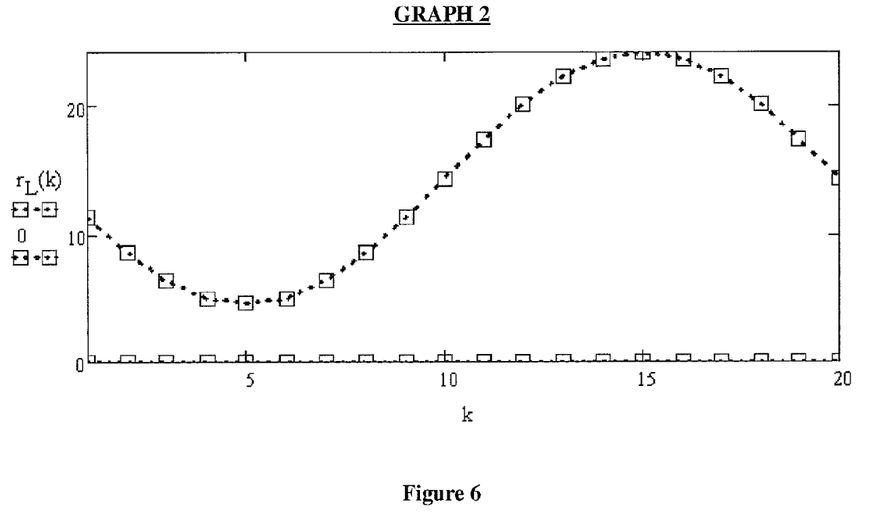
FIG. 6 illustrates GRAPH 2.

Now calculating the actual fold lengths (such as for example to calculate the active carbon-electrode sectional area) would be the function ($r_{i0}-r_i(k)$), which is plotted in GRAPH 2 shown in FIG. 6.

Figure 7:
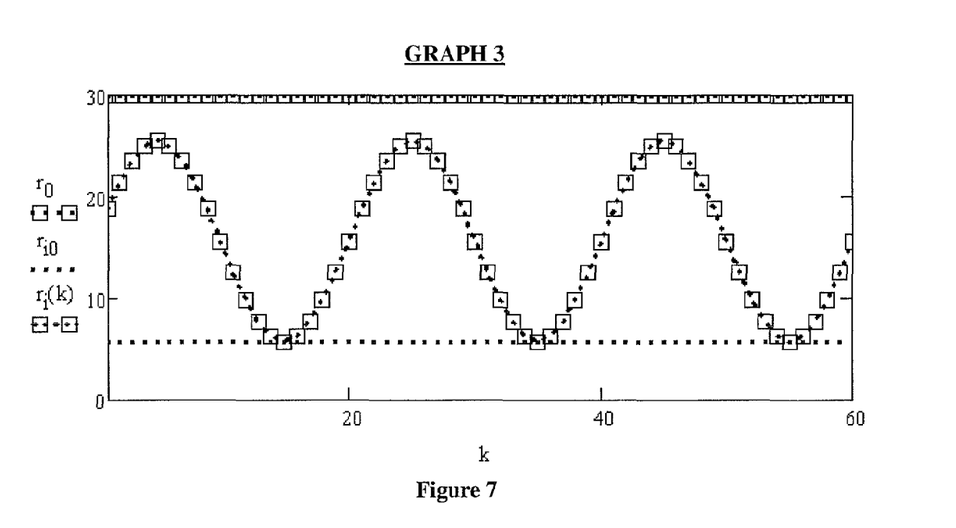
FIG. 7 illustrates GRAPH 4.

In one embodiment, an integral number of "cycles" around the annular volume is calculated, such as for example in a 3N pattern, wherein the final pattern is shown by GRAPH 3 in FIG. 7.

In this embodiment, N=60, for three full cycles, with each cycle reflecting 20 folds, as shown above.

The presently disclosed energy-storage device electrode core embodiments are a significant progression on modem design techniques. The present teachings eliminate the need for a core involute and leave the electrode core hollow for other uses, such as for example evacuation of heat from cell (such as for example using liquid, air, etc. . . . ). Also, in some embodiments the foil edges of the electrode are only present at the inner and outer radii, which means that thermal conduction is enhanced (i.e., no carbon layer intervenes), and heat removal is faster and more efficient. Such thermal benefits of the present teachings contribute to increased energy-storage device cell longevity and overall performance because (1) the cell has more efficient operation, (hence less heat generated), (2) the cell is subjected to more rapid heat removal (that is, more efficient cooling), and (3) the cell can operate at higher temperatures without failure.

In one embodiment, heat is routed directly to one or more endcaps of an energy-storage device. Such routing facilitates cooling and eliminates and/or reduces thermal gradients inside the energy storage device. Therefore, individual energy cells, and/or cell modules, are capable of being pushed to higher thermal limits than previously proposed solutions.

Moreover, a substantial reduction in equivalent series resistance (ESR) is achieved by the present disclosure, over prior-art solutions, because the inductance of the electrode core is greatly reduced by eliminating the many turns of a typical jelly-roll type electrode core, and because current largely flows along a longitudinal axis of an energy storage device electrode core, thereby eliminating the previous circumferential current path about the electrode core. The equivalent series resistance (ESR) is reduced as inductive impedance is reduced, due in part to the shortened conductive pathway along which the current must travel within the electrode core.

CONCLUSION

The foregoing description illustrates exemplary implementations, and novel features, of aspects of an apparatus and article of manufacture for effectively providing an energy-storage electrode core. Given the wide scope of potential applications, and the flexibility inherent in electro-mechanical design, it is impractical to list all alternative implementations of the method and apparatus. Therefore, the scope of the presented disclosure is not limited by features illustrated or described herein.

While the above description has pointed out novel features of the present teachings as applied to various embodiments, the skilled person will understand that various omissions, substitutions, permutations, and changes in the form and details of the methods and apparatus illustrated may be made without departing from the scope of the disclosure. These and other variations constitute embodiments of the described methods and apparatus.

Each practical and novel combination of the elements and alternatives described hereinabove, and each practical combination of equivalents to such elements, is contemplated as an embodiment of the present disclosure. All variations coming within the meaning and range of equivalency of the various claim elements are embraced within the scope of the corresponding claim. Each claim set forth below is intended to encompass any system or method that differs only insubstantially from the literal language of such claim, as long as such apparatus or method is not, in fact, an embodiment of the prior art. To this end, each described element in each claim should be construed as broadly as possible, and moreover should be understood to encompass any equivalent to such element insofar as possible without also encompassing the prior art.

The invention claimed is:

1. An energy-storage electrode core, adapted for use in an energy-storage device, comprising:
    a first current-collector foil element having a first side and a second side, comprising:
        a first plurality of carbon-electrode elements disposed on said first side of said first current-collector foil element,
            wherein said first plurality of carbon-electrode elements define a first plurality of fold-zone regions defined between a first plurality of fold-zone demarcation regions, and
        a second plurality of carbon-electrode elements disposed on said second side of said first current-collector foil element,
            wherein said second plurality of carbon-electrode elements define a second plurality of fold-zone regions defined between a first plurality of fold zone demarcation regions;
    a second current-collector foil element having a first side and a second side, comprising:
        a third plurality of carbon-electrode elements disposed on said first side of said second current-collector foil element,
            wherein said third plurality of carbon-electrode elements define a third plurality of fold-zone regions defined between a second plurality of fold zone demarcation regions, and
        a fourth plurality of carbon-electrode elements disposed on said second side of said second current-collector foil element,
            wherein said fourth plurality of carbon-electrode elements define a fourth plurality of fold-zone regions defined between a second plurality of fold zone demarcation regions;
    a separator element, having a front side and a back side,
        wherein the front side of said separator element is affixed to said second side of said first current-collector foil element,
        wherein the back side of said separator element is affixed to said first side of said second current-collector foil element, and
        wherein said separator element prevents said first current-collector foil element from electronically shorting to said second current-collector foil element, while still allowing ionic current flow therebetween; and
    a center axis about which said fold-zones of said current-collector foil elements are circumferentially collapsed,
        wherein folded electrode elements are disposed in a substantially annular form, forming substantially a single loop of radial electrode folds, and wherein said pluralities of fold-zone demarcation regions are approximately laterally and co-axially aligned with respect to said first and second current-collector foils.

2. The energy-storage electrode core of claim 1, wherein said energy-storage device is an ultracapacitor.

3. The energy-storage electrode core of claim 1, wherein said energy-storage device is a battery.

4. The energy-storage electrode core of claim 3, wherein said battery is a lithium-ion battery.

5. The energy-storage electrode core of claim 1, wherein said energy-storage device is a hybrid energy-storage device.

6. A method adapted for use in an energy-storage device, comprising the steps of:

providing a first current-collector foil element having a first side and a second side, comprising:
 a first plurality of carbon-electrode elements disposed on said first side of said first current-collector foil element,
  wherein said first plurality of carbon-electrode elements define a first plurality of fold-zone regions defined between a first plurality of fold-zone demarcation regions, and
 a second plurality of carbon-electrode elements disposed on said second side of said first current-collector foil element,
  wherein said second plurality of carbon-electrode elements define a second plurality of fold-zone regions defined between a first plurality of fold zone demarcation regions;

providing a second current-collector foil element having a first side and a second side, comprising:
 a third plurality of carbon-electrode elements disposed on said first side of said second current-collector foil element,
  wherein said third plurality of carbon-electrode elements define a third plurality of fold-zone regions defined between a second plurality of fold zone demarcation regions, and
 a fourth plurality of carbon-electrode elements disposed on said second side of said second current-collector foil element,
  wherein said fourth plurality of carbon-electrode elements define a fourth plurality of fold-zone regions defined between a second plurality of fold zone demarcation regions;

providing a separator element, having a front side and a back side,
 wherein the front side of said separator element is affixed to said second side of said first current-collector foil element,
 wherein the back side of said separator element is affixed to said first side of said second current-collector foil element, and
 wherein said separator element prevents said first current-collector foil element from electronically shorting to said second current-collector foil element, while still allowing ionic current flow therebetween; and circumferentially collapsing said fold-zones of said current-collector foil elements about a center axis,
 wherein folded electrode elements are disposed in a substantially annular form, forming substantially a single loop of radial electrode folds, and
 wherein said pluralities of fold-zone demarcation regions are approximately laterally and co-axially aligned with respect to said first and second current-collector foils.

7. The method of claim 6, wherein said energy-storage device is an ultracapacitor.

8. The method of claim 6, wherein said energy-storage device is a battery.

9. The method of claim 8, wherein said battery is a lithium-ion battery.

10. The method of claim 6, wherein said energy-storage device is a hybrid energy-storage device.

11. An energy-storage electrode core, comprising:
 a current collector; and
 a first plurality of carbon electrode elements disposed along a first side of the current collector, the carbon electrode elements spaced apart from each other such that a fold-zone demarcation region extends within a gap formed between adjacent pairs of carbon electrode elements;
 wherein the current collector and the first plurality of carbon electrode elements are folded along the fold-zone demarcation regions to form a modulated pattern of folds that extends annularly around a center axis.

12. The energy-storage electrode core of claim 11, wherein the modulated pattern of folds forms a substantially annular ring extending around the center axis.

13. The energy-storage electrode core of claim 12, wherein the annular ring forms a hollow core extending along the center axis.

14. The energy-storage electrode core of claim 11, further comprising a second plurality of carbon electrode elements disposed along a second side of the current collector and opposed to the first plurality of carbon electrode elements.

15. The energy-storage electrode core of claim 11, further comprising a second current collector separated from the first current collector by a separator element.

16. The energy-storage electrode core of claim 11, wherein the modulated pattern of folds comprises a sinusoidal modulated pattern of folds.

17. The energy-storage electrode core of claim 11, wherein the modulated pattern of folds comprises folds of differing widths.

18. The energy-storage electrode core of claim 11, wherein the current collector comprises an aluminum foil.

19. An ultracapacitor, comprising the energy-storage electrode core of claim 11.

20. The ultracapacitor of claim 19, further comprising electrolyte disposed within the energy-storage electrode core.

* * * * *